United States Patent [19]

Coll

[11] Patent Number: 4,773,767
[45] Date of Patent: Sep. 27, 1988

[54] THERMOMETER DEVICE FOR A WATER TAP

[76] Inventor: Alain Coll, 10 rue des Albatros, 77200 Croissy Beaubourg, France

[21] Appl. No.: 32,673

[22] Filed: Apr. 1, 1987

[30] Foreign Application Priority Data

Apr. 8, 1986 [FR] France ............................ 86 04992

[51] Int. Cl.⁴ ............................................. G01K 11/16
[52] U.S. Cl. .................................. 374/147; 116/217; 116/276; 350/114; 350/331 T; 374/162
[58] Field of Search ................ 374/147, 191, 162; 350/331 T, 114; 116/276

[56] References Cited

U.S. PATENT DOCUMENTS

| | | | |
|---|---|---|---|
| 1,692,012 | 11/1928 | Wells | 374/162 X |
| 2,313,688 | 3/1943 | Wappner | 374/191 |
| 3,052,158 | 9/1962 | Sonni | 374/191 |
| 3,440,882 | 4/1969 | Jones | 374/162 |
| 3,651,695 | 3/1972 | Brown | 374/162 X |
| 3,952,594 | 4/1976 | McMahan | 374/147 |
| 4,281,543 | 8/1981 | Raz | 374/147 |
| 4,435,094 | 3/1984 | Shapiro | 374/191 |
| 4,669,822 | 6/1987 | Myers | 350/114 |

Primary Examiner—Daniel M. Yasich
Attorney, Agent, or Firm—Sughrue, Mion, Zinn, Macpeak & Seas

[57] ABSTRACT

The thermometer device enables the temperature of hot water or mixed hot and cold water to be read directly from the outlet of a tap or faucet or mixing tap or shower head. The thermometer device comprises a cylinder (1) including a conventional nozzle-type device (2) such as an anti-splash nozzle, a spray nozzle, an aerating nozzle, or a flow rate restricting nozzle. The outer circumference of the thermometer device is fitted with a liquid crystal temperature-sensitive sheet (3). This temperature-sensitive sheet is protected from ingress of water by a transparent resin envelope (4) which is sealed by a sealing ring (5). When water runs through the tap, its temperature is communicated to the temperature-sensitive sheet by conduction through the cylinder, and is then displayed thereon.

5 Claims, 1 Drawing Sheet

THERMOMETER DEVICE FOR A WATER TAP

The present invention relates to a thermometer device for indicating the temperature of hot water or of mixed hot and cold water, and specifically designed for use with an ordinary tap or faucet, or with a tap for mixing hot and cold water to supply warm water to a basin or a shower, for example.

BACKGROUND OF THE INVENTION

Heretofore, there has been no simple device for displaying the temperature at the outlet from such taps. These taps generally include some kind of nozzle at their end, e.g. an anti-splash nozzle, a spray nozzle, an aerating or foaming nozzle, etc. Proposals have already been made for taps having a wall including a liquid crystal thermometer embedded in a recess provided for the purpose in the wall (French patent No. 2,541,751). Proposals have also been made for hand-held shower heads that include a chamber with a perforated wall and have another wall fitted with a liquid crystal thermometer (e.g. U.S. Pat. No. 4,281,543). These devices are not simple. Whenever it is desired to fit one, the entire tap must be changed, which is expensive.

The present invention seeks to remedy this drawback.

SUMMARY OF THE INVENTION

The present invention provides a thermometer device suitable for fitting to a tap or faucet, including taps for mixing hot and cold water, and shower heads, or the like, said thermometer device being constituted by a cylindrical element having one end adapted for fitting to such a tap and capable of receiving nozzle means such as an anti-splash nozzle, a spray nozzle, an aerating nozzle, a flow rate restricting nozzle, or the like, the thermometer device including the improvement of a temperature-sensitive liquid crystal sheet applied around the outer cylindrical wall of said cylindrical element, with said sheet being covered by a protective transparent cylindrical envelope.

Advantageously, the transparent outer envelope has a curved face providing a magnifying glass effect for reading the temperature. In a variant, the transparent outer envelope may have a facetted face providing a reflector effect enabling reading at a more vertical angle.

The outer envelope may be glued, welded, or molded over the cylinder.

In a preferred embodiment, the temperature display strip is directly included in the transparent envelope.

BRIEF DESCRIPTION OF THE DRAWING

An embodiment of the invention is described by way of example with reference to the accompanying drawing, in which.

MORE DETAILED DESCRIPTION

Figure 1:
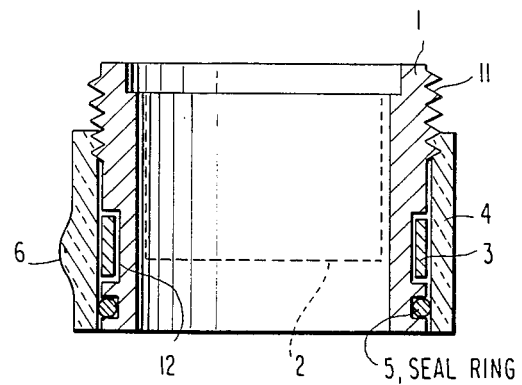
FIG. 1 is a section through a thermometer device in accordance with the invention.
Figure 2:
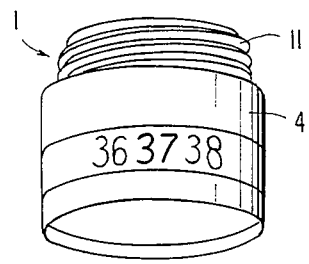
FIG. 2 is a perspective view of the same device.

This thermometer device is intended to replace a conventional end fitting for application to a tap, such end fittings being already mass-produced by various manufacturers.

A thermometer device in accordance with the invention is very simple to put into place, since it merely screws onto the tap instead of the conventional end fitting.

The device is constituted by a cylindrical portion or ring 1 made of chromium-plated brass and threaded or tapped at one of its ends in a manner suitable for fitting to any given particular type of tap. Such adaptor rings can readily be provided for a wide range of taps from different manufacturers.

The axial length of the ring is usually about 2 cm and its upstream end is threaded or tapped at 11 with one of the threads commonly found on taps, e.g. ⅜, ½, or ¾.

In addition, the ring has a groove 12 specially provided for receiving a temperature-sensitive liquid crystal sheet: or strip 3 which is applied around the outside of the ring.

Inside the ring there is a conventional nozzle component 2 such as an anti-splash nozzle, a spray nozzle, or a flow rate restricting nozzle, for example, and the outside of the ring is surrounded by a protective envelope 4 of transparent resin allowing the temperature displayed by the liquid crystals to be read.

In a variant, this envelope has a curved face 6 giving a magnifying glass effect, or else it has facets providing a reflector effect enabling reading at a more vertical angle.

The envelope is screwed to the above-described ring at one end and it is sealed at its other end by a sealing ring 5 contained in a groove provided for the purpose in the outside surface of the ring.

In a preferred embodiment, the temperature-sensitive strip is directed included in the transparent envelope.

When intended for use with a hand-held shower head, the device may be inserted as a connector ring between the flexible hose and the shower head itself.

A thermometer in accordance with the invention is particularly intended to be fitted to taps and shower heads.

When water flows through the tap, its temperature is communicated by conduction to the sheet of liquid crystals which then reacts in accordance with its characteristics to display the temperature of the water being used, or else to display a symbol representative of the change in temperature.

The useful temperature range is 25° C. to 60° C.

It can be seen that a thermometer in accordance with the invention is simple and cheap. It can readily be installed by any user without requiring a specialist plumber. If the temperature-sensitive strip is spoiled, the user can easily replace the thermometer device without damaging the remainder of the plumbing. Indeed if the protective envelope of transparent resin is dismountable (as shown in FIG. 1) the user may alternatively merely replace the temperature-sensitive liquid crystal strip.

I claim:

1. A thermometer device suitable for fitting to a tap or faucet, including taps for mixing hot and cold water, and shower heads, or the like, said thermometer device being constituted by a cylindrical element having one end adapted for fitting to such a tap for receiving nozzle means such as an anti-splash nozzle, a spray nozzle, an aerating nozzle, a flow rate restricting nozzle, or the like, the thermometer device including the improvement of a temperature-sensitive liquid crystal sheet applied around the outer cylindrical wall of said cylindrical element, with said sheet being covered by a protective transparent cylindrical outer envelope, an upstream end of the cylindrical element including a threaded portion for fitting to the tap, the liquid crystal sheet being sealingly retained in place on the cylindrical element by the threaded engagement of the transparent envelope with the threaded portion of the cylindrical element.

2. A thermometer device according to claim 1, wherein the transparent outer envelope has a curved face giving a magnifying glass effect for reading the temperature-sensitive steet.

3. A thermometer device according to claim 1, wherein the transparent outer envelope has a facetted face providing a reflector effect enabling reading at a more vertical angle.

4. A thermometer device according to claim 1, wherein the transparent outer envelope is glued or welded over the cylindrical element.

5. A thermometer device according to claim 1, wherein the temperature-sensitive sheet is included within the transparent outer envelope.

* * * * *